US010459265B2

(12) United States Patent
Kawata

(10) Patent No.: US 10,459,265 B2
(45) Date of Patent: Oct. 29, 2019

(54) DISPLAY DEVICE

(71) Applicant: Japan Display Inc., Minato-ku (JP)

(72) Inventor: Yasushi Kawata, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 15/883,133

(22) Filed: Jan. 30, 2018

(65) Prior Publication Data
US 2018/0217434 A1    Aug. 2, 2018

(30) Foreign Application Priority Data

Feb. 1, 2017 (JP) ................. 2017-016756

(51) Int. Cl.
| | | |
|---|---|---|
| G02F 1/1333 | (2006.01) | |
| G02F 1/1368 | (2006.01) | |
| G02F 1/1362 | (2006.01) | |
| G02F 1/1339 | (2006.01) | |
| G02F 1/1345 | (2006.01) | |

(52) U.S. Cl.
CPC ...... *G02F 1/133305* (2013.01); *G02F 1/1339* (2013.01); *G02F 1/1368* (2013.01); *G02F 1/13452* (2013.01); *G02F 1/13458* (2013.01); *G02F 1/136227* (2013.01); *G02F 1/136286* (2013.01); *G02F 2001/13398* (2013.01); *G02F 2001/13685* (2013.01); *G02F 2001/133368* (2013.01); *G02F 2202/28* (2013.01)

(58) Field of Classification Search
CPC ............................. G02F 1/133305
See application file for complete search history.

(56) References Cited

U.S. PATENT DOCUMENTS

| | | | |
|---|---|---|---|
| 2008/0100789 A1 | 5/2008 | Kamiya | |
| 2009/0098315 A1* | 4/2009 | Matsuda | C09J 133/14 428/1.33 |
| 2013/0112984 A1* | 5/2013 | Kim | H01L 51/0096 257/72 |
| 2014/0353670 A1 | 12/2014 | Youn et al. | |
| 2015/0287750 A1 | 10/2015 | Youn et al. | |
| 2016/0268524 A1* | 9/2016 | Suzuki | H01L 51/0097 |
| 2018/0132371 A1* | 5/2018 | Yeum | G02F 1/133305 |

FOREIGN PATENT DOCUMENTS

| | | |
|---|---|---|
| JP | 2004-93627 | 3/2004 |
| JP | 2005-17567 | 1/2005 |
| JP | 2008-112029 | 5/2008 |
| JP | 2011-128224 | 6/2011 |
| JP | 2014-232300 | 12/2014 |

* cited by examiner

*Primary Examiner* — Edmond C Lau
(74) *Attorney, Agent, or Firm* — Oblon, McClelland, Maier & Neustadt, L.L.P.

(57) ABSTRACT

According to one embodiment, a display device includes a first substrate including a first insulating substrate, a second substrate including a second insulating substrate and opposing the first substrate, and an adhesive layer which attaches the first substrate and the second substrate together. The adhesive layer includes a first portion extending in a first direction. The first portion includes a first end portion and a second end portion, each extending in the first direction. The second substrate includes a third end portion located between the first end portion and the second end portion and extending in the first direction. The first substrate and the second substrate are bent in a position overlapping the first portion.

11 Claims, 8 Drawing Sheets

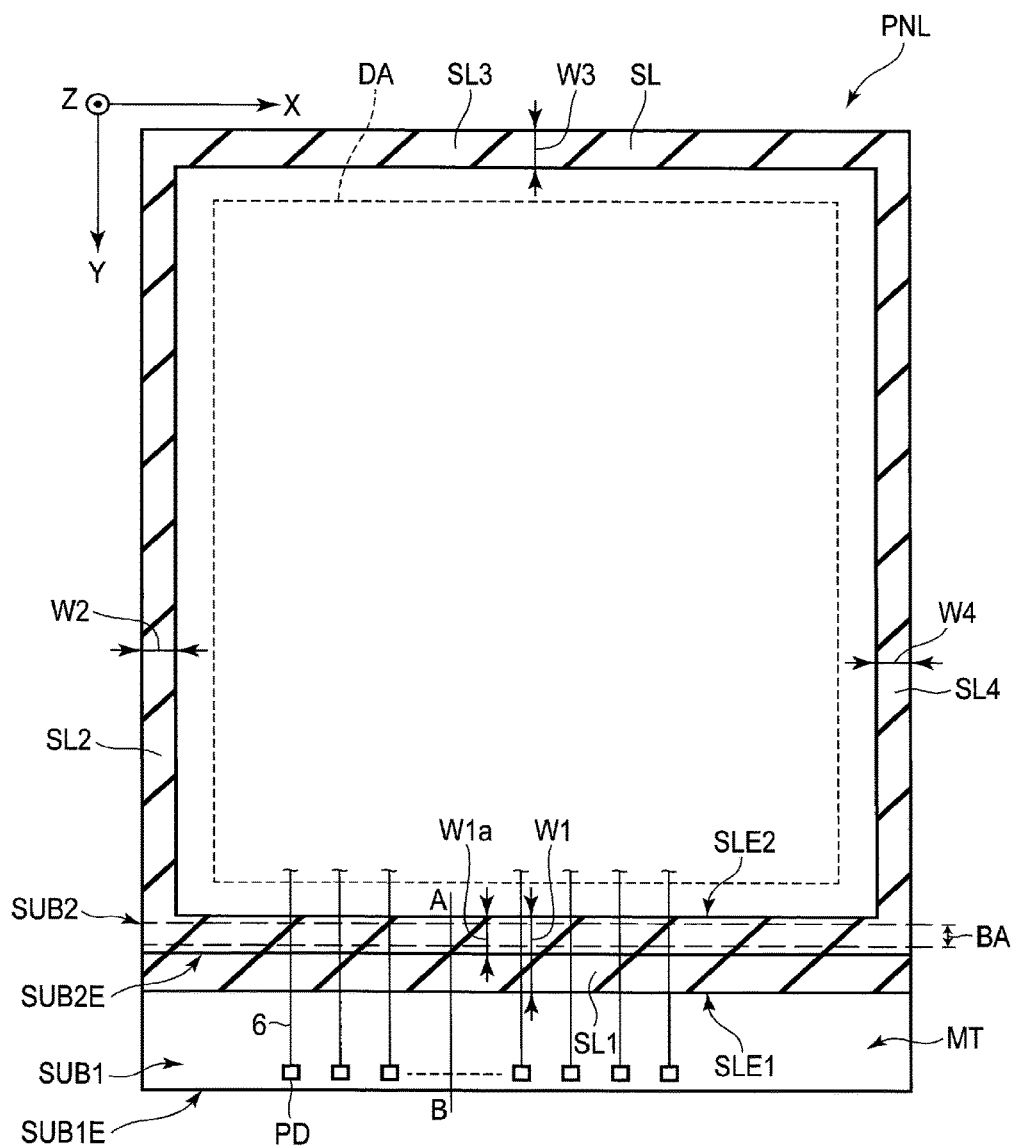
F I G. 3

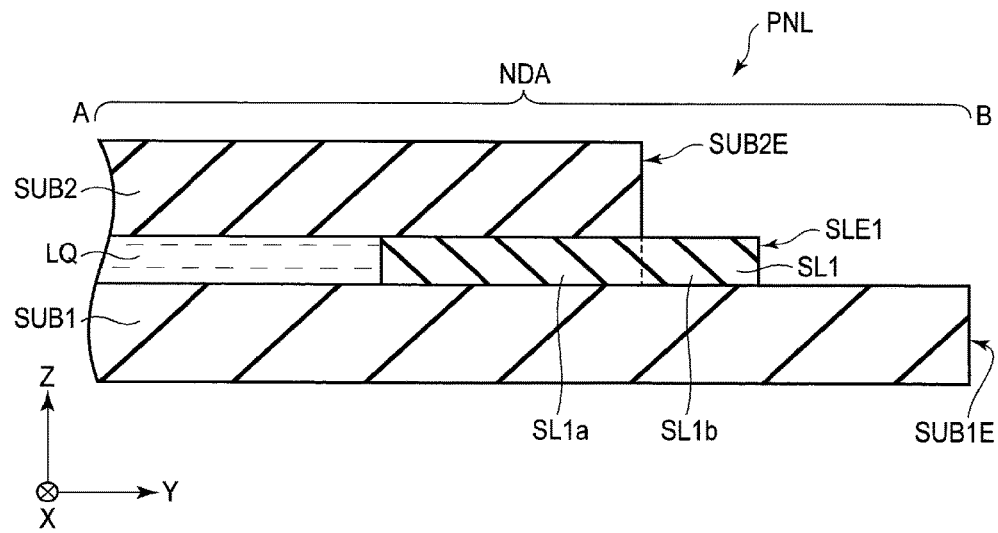
F I G. 4
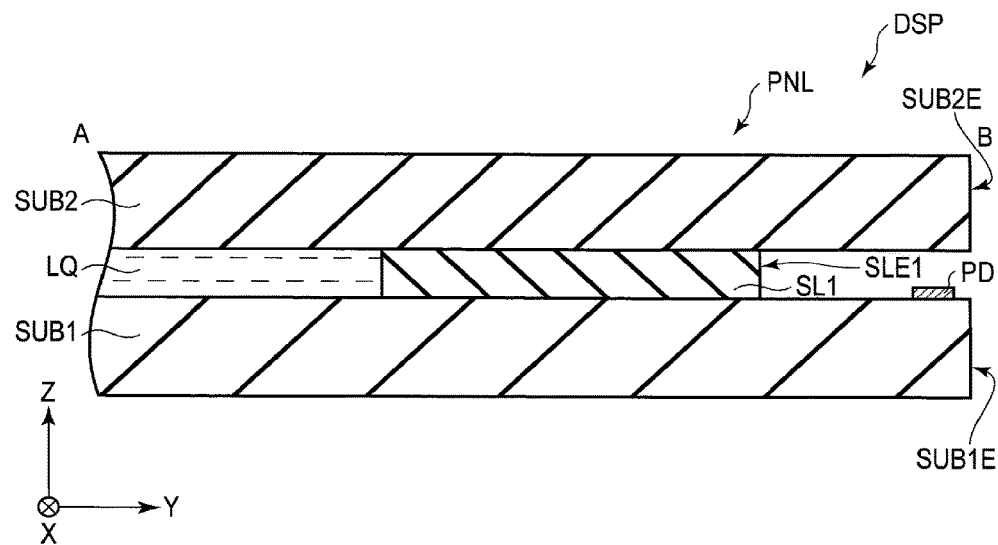
F I G. 5

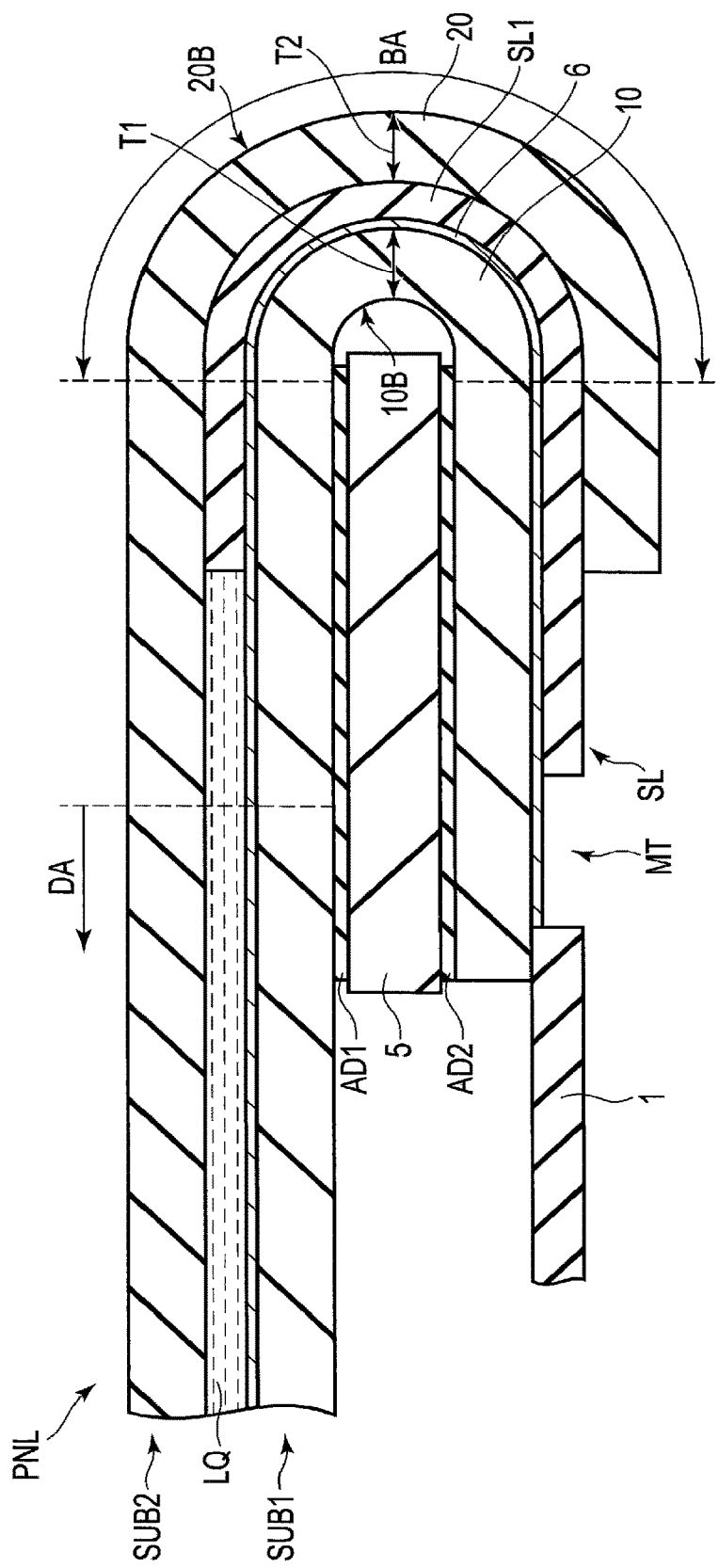
F I G. 7

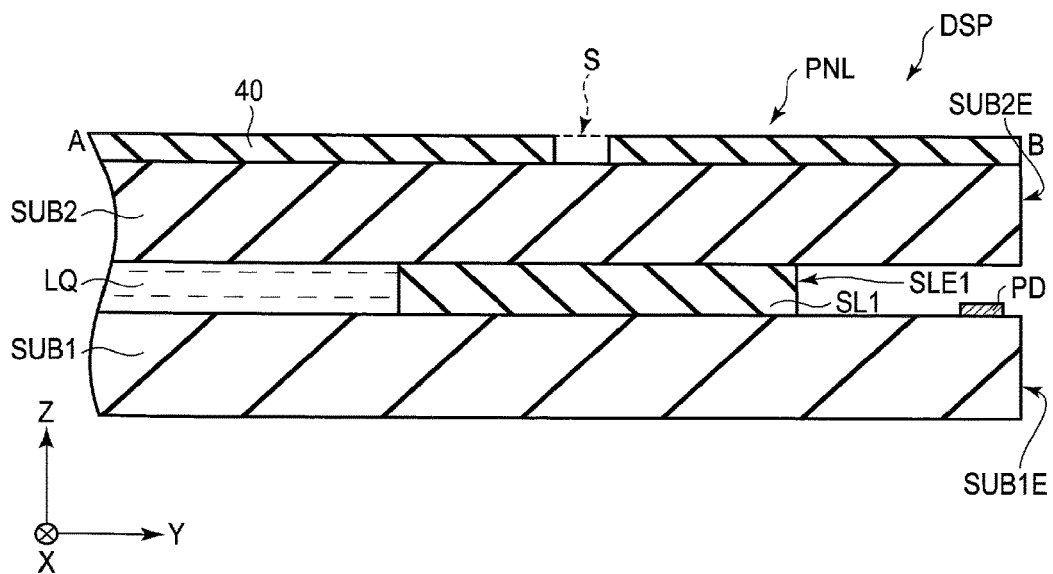
F I G. 8

DISPLAY DEVICE

CROSS-REFERENCE TO RELATED APPLICATIONS

This application is based upon and claims the benefit of priority from Japanese Patent Application No. 2017-016756, filed Feb. 1, 2017, the entire contents of which are incorporated herein by reference.

FIELD

Embodiments described herein relate generally to a display device.

BACKGROUND

Display devices are formed by, for example, attaching a first substrate and a second substrate together a sealing material. A method of manufacturing such a display device, includes, after attaching two substrates together with a sealing material and cutting the resultant into individual pieces of display panels, a processing step of cutting and removing a part of the second substrate to expose an electrode disposed on a mounting portion on the first substrate. Here, in order to avoid the laser beam for cutting the second substrate from being applied onto the electrode, such a technique that a member which shields the laser beam between the electrode and the second substrate.

Moreover, in recent years, a flexible type display device has been developed, in which the display panel is formed flexible by using a resin substrate such as polyimide as its substrate. For example, in a such flexible type display device, the wiring region outside the display area, where various wiring lines are formed, is bent towards the back side of the display area, to realize the reduction of the width of the frame. In this case, however, there is a risk that a wiring line is damaged by the stress resulting from bending.

BRIEF DESCRIPTION OF THE DRAWINGS

FIG. 3 is a plan view of a structure of a display panel of the embodiment.

FIG. 4 is a cross-sectional view of the display panel taken along line A-B shown in FIG. 3.

FIG. 5 is a diagram illustrating a step in a method of manufacturing the display device of the embodiment.

FIG. 7 is a diagram illustrating a state where a bend area is bent in the display device according to the embodiment.

FIG. 8 is a cross-sectional view showing a step in another method of manufacturing the display device of the embodiment.

DETAILED DESCRIPTION

In general, according to one embodiment, a display device comprises a first substrate comprising a first insulating substrate, a second substrate comprising a second insulating substrate and opposing the first substrate and an adhesive layer which attaches the first substrate and the second substrate together, wherein the adhesive layer comprising a first portion extending in a first direction, the first portion comprising a first end portion and a second end portion, each extending in the first direction, the second substrate comprising a third end portion located between the first end portion and the second end portion and extending in the first direction, and the first substrate and the second substrate being bent in a position overlapping the first portion.

An embodiment will be described hereinafter with reference to the accompanying drawings. Note that the disclosure is a mere example presented for the sake of exemplification, and any modification and variation conceived within the scope and spirit of the invention by a person having ordinary skill in the art are naturally encompassed in the scope of invention of the present application. Further, a width, thickness, shape, and the like of each element are depicted schematically in the figures as compared to actual embodiments for the sake of simpler explanation, and they do not limit the interpretation of the invention of the present application. Furthermore, in the description and figures of the present application, structural elements having the same or similar functions will be referred to by the same reference numbers and detailed explanations of them that are considered redundant may be omitted.

The main configuration disclosed in this embodiment is applicable to liquid crystal display devices, organic electroluminescence display devices and the like.

Figure 1:
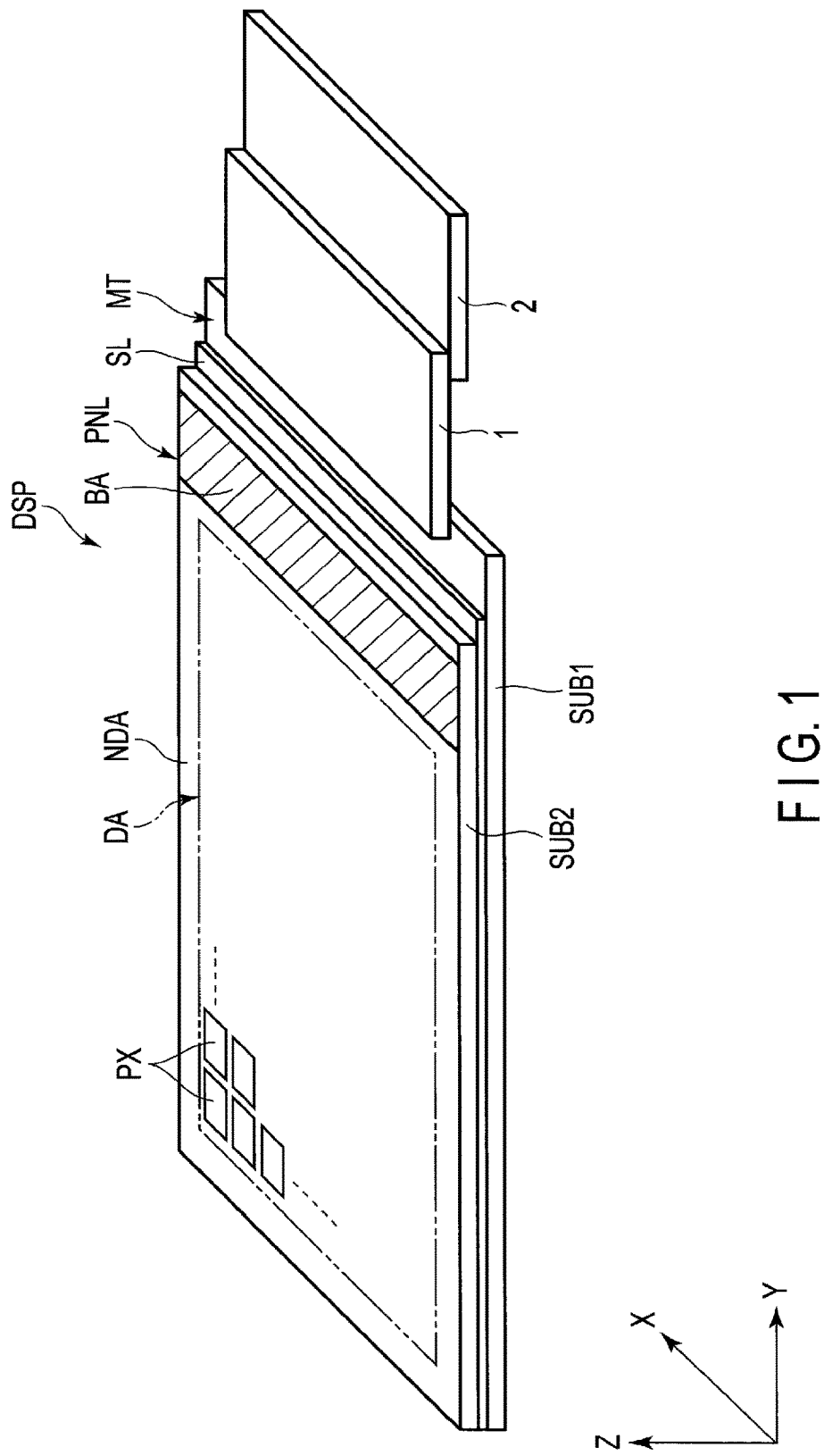
FIG. 1 is a perspective view showing a structure of a display device according to an embodiment.

FIG. 1 is a perspective view illustrating a configuration of a display device DSP according to the embodiment. FIG. 1 shows a three-dimensional space defined by a first axis X, a second axis Y orthogonal to the first axis X, and a third axis Z orthogonal to the first axis X and the second axis Y. The first direction X, second direction Y and third direction Z are orthogonal to each other, but they may cross each other at an angle other than 90 degrees.

As shown in FIG. 1, the display device DSP comprises a display panel PNL, a wiring substrate 1 and a flexible wiring substrate 2. The display panel PNL includes a plate-like first substrate SUB1, plate-like second substrate SUB2 opposing the first substrate SUB1, and a sealing material SL interposed between the first substrate SUB1 and the second substrate SUB2.

In the following explanation, a direction from the first substrate SUB1 toward the second substrate SUB2 is referred to as upward (or merely above), and a direction from the second substrate SUB2 toward the first substrate SUB1 is referred to as downward (or merely below). Viewing from the second substrate SUB2 towards the first substrate SUB1 is defined as plan view.

The display panel PNL includes a display area DA which displays images and a non-display area NDA surrounding the display area DA. The display panel PNL includes a plurality of pixels PX in the display area DA. The pixels PX are arranged in a matrix along the first direction X and the second direction Y.

The first substrate SUB1 includes a mounting portion MT extending in the second direction Y further from the region overlapping the second substrate SUB2. Here, a side edge of the first substrate SUB1, which is parallel to the first direction X and a side edge of the second substrate SUB2, which is parallel to the first direction X, have substantially the same length. Furthermore, a side edge of the first substrate SUB1, which is parallel to the second direction Y, and a side edge of the second substrate SUB2, which is parallel to the second direction Y, have substantially the same length. That is, an area of the first substrate SUB1, which is parallel to the X-Y plane, is substantially the same as that of the second substrate SUB2 parallel to the X-Y plane. Here, the X-Y plane is a plane defined by the first direction X and the second direction Y.

The sealing material SL corresponds to the adhesive layer which attaches the first substrate SUB1 and the second substrate SUB2 together. In the example illustrated, the sealing material SL extends out in the second direction Y further from the region overlapping the second substrate SUB2 and is disposed also on the mounting portion MT.

The wiring substrate 1 is adhered to above the mounting portion MT in the non-display area NDA. In the example illustrated, the length of a side edge of a wiring substrate 1, which is parallel to the first direction X is less than that of a side edge of the first substrate SUB1, which is parallel to the first direction X, but they may be substantially the same. The wiring substrate 1 is electrically connected to the display panel PNL.

The flexible wiring substrate 2 is disposed below the wiring substrate 1, and is electrically connected to the wiring substrate 1. The flexible wiring substrate 2 overlaps a side of the wiring substrate 1, opposite to the side overlapping the first substrate SUB1. Note that the flexible wiring substrate 2 may be disposed above the wiring substrate 1.

Here, in this embodiment, the display device DSP comprises a bend area BA to be bent when accommodated in a housing such as of an electronic device. In the figure, the bend area BA is indicated by hatch lines. To explain, the bend area BA is bent so that the wiring substrate 1 and the flexible wiring substrate 2 are disposed below the display area DA. The bend area BA is located within the non-display area NDA.

Note that this embodiment will be described in connection with an example case where the display device is a liquid crystal display.

Figure 2:
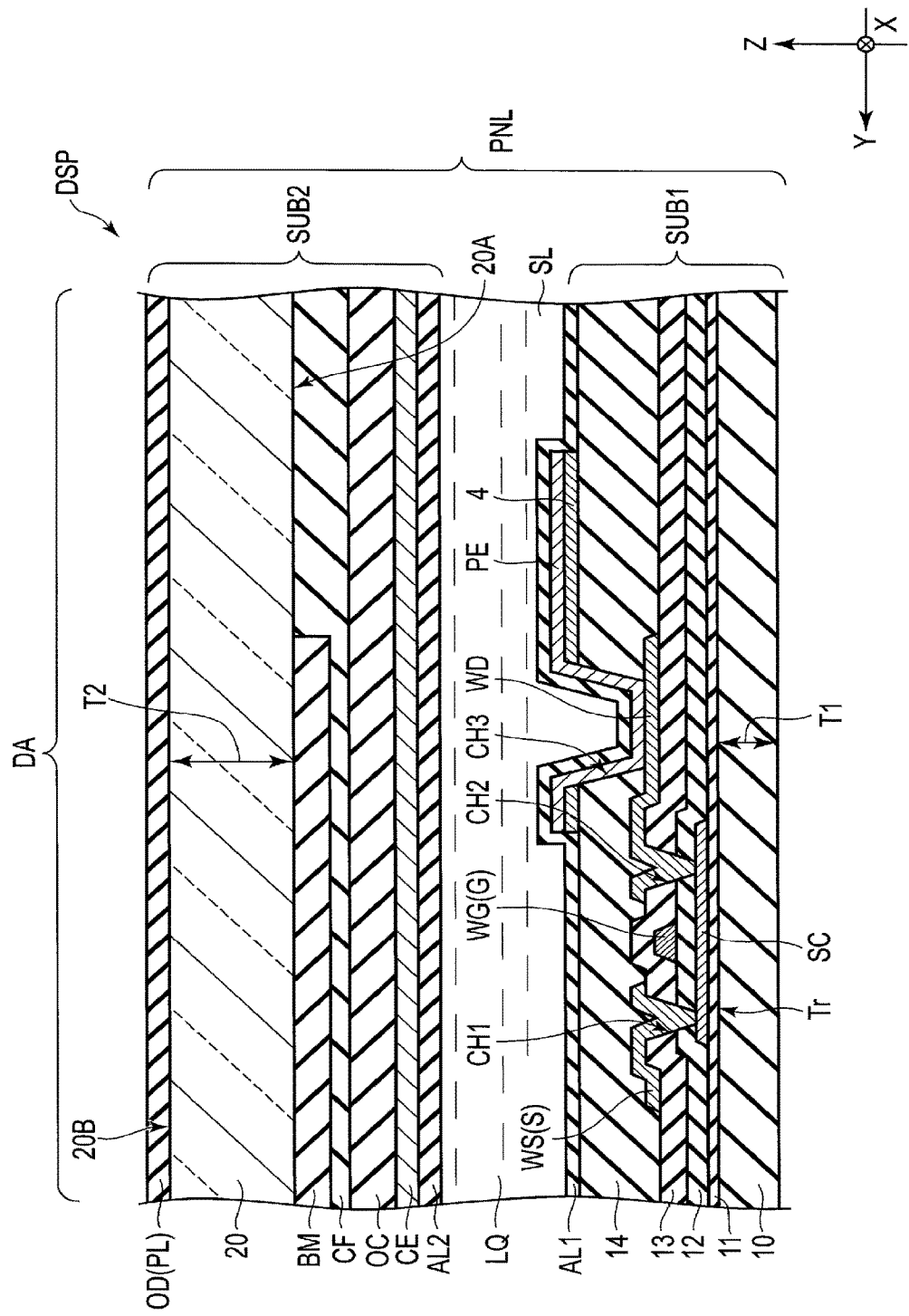
FIG. 2 is a cross-sectional view of a display area of the display device of FIG. 1.

FIG. 2 is a cross-sectional view of a display area DA of the display device DSP of FIG. 1. FIG. 2 shows a reflective liquid crystal display which employs a twisted nematic (TN) mode as an example.

As shown in FIG. 2, the first substrate SUB1 comprises a first insulating substrate 10, a thin film transistor Tr, a reflective layer 4, a pixel electrode PE, a first alignment film AL1, a first insulating film 11, a second insulating film 12, a third insulating film 13, a fourth insulating film 14 and the like.

The first insulating substrate 10 is formed from an organic insulating material, for example, polyimide. The first insulating substrate 10 is covered by the first insulating film 11.

The thin film transistor Tr is formed above the first insulating film 11. In the example illustrated, the thin film transistor Tr is configured as a top gate type, but it may be of a bottom gate type. The thin film transistor Tr comprises a semiconductor layer SC formed on the first insulating film 11. The semiconductor layer SC is covered by the second insulating film 12. Moreover, the second insulating film 12 is disposed also on the first insulating film 11.

A gate electrode WG of the thin film transistor Tr is formed on the second insulating film 12 and is located immediately above the semiconductor layer SC. The gate electrode WG is electrically connected to a gate line G (or formed integrally with the gate line G) and is covered by the third insulating film 13. Further, the third insulating film 13 is disposed also on the second insulating film 12.

The first insulating film 11, second insulating film 12, and third insulating film 13 are formed of an inorganic material such as silicon oxide or silicon nitride.

A source electrode WS and a drain electrode WD of the thin film transistor Tr are formed on the third insulating film 13. Similarly, a source line S is formed on the third insulating film 13. The source electrode WS is electrically connected to the source line S (or formed integrally with the source line S). The source electrode WS and the drain electrode WD are electrically connected to the semiconductor layer SC via contact holes penetrating the second insulating film 12 and the third insulating film 13, respectively. The thin film transistor Tr is covered by the fourth insulating film 14. The fourth insulating film 14 is disposed also on the third insulating film 13. The fourth insulating film 14 is formed of, for example, an organic material such as transparent resin.

The reflective layer 4 is formed on, for example, the fourth insulating film 14. The reflective layer 4 is formed of a highly reflective metal material such as aluminum and silver. Note that the surface of the reflective layer 4 (which is the side on a second substrate SUB2 side) may be an uneven surface to impart light scattering property.

The pixel electrode PE is formed on the fourth insulating film 14, but in the illustrated example, it is overlaid on the reflective layer 4. Note that it suffices if the reflective layer 4 is formed in a position opposing the pixel electrode PE, or another insulating film may be interposed between the pixel electrode PE and the reflective layer 4. The pixel electrode PE is in contact with the drain electrode WD of the thin film transistor Tr via a contact hole CH3 penetrating the fourth insulating film 14. The pixel electrode PE is formed of a transparent conductive material such as indium tin oxide (ITO) or indium zinc oxide (IZO). The pixel electrode PE is covered by the first alignment film AL1.

On the other hand, the second substrate SUB2 is located above the first substrate SUB1 to oppose the first substrate SUB1. The second substrate SUB2 comprises a second insulating substrate 20, a light-shielding layer BM, a color filter CF, an overcoat layer OC, a common electrode CE, a second alignment film AL2 and the like.

The first insulating substrate 20 is formed from an organic insulating material, for example, polyimide. Here, a thickness T1 of the first insulating substrate 10 along the third direction Z and a thickness T2 of the second insulating substrate 20 along the third direction Z may be different from each other. For example, the thickness T1 is less than the thickness T2.

The light-shielding layer BM is formed on a main surface 20A side of the second insulating substrate 20. The light-shielding layer BM is formed to partition the pixels PX from each other, and to oppose wiring parts such as the gate lines G, source lines S and the thin film transistor Tr, provided in the first substrate SUB1 and also the contact hole CH3 and the like. The light-shielding layer BM is formed of a metal material having light-shielding properties or a black resin material.

The color filter CF is formed on the main surface side to partially overlap the light-shielding layer BM. The color filter CF is formed of resin materials colored in a plurality of different colors, for example, red, blue and green. A red color filter is disposed to correspond to a red pixel, a green color filter is disposed to correspond to a green pixel and a blue color filter is disposed to correspond to a blue pixel. Note that the color filter CF may further include a white or transparent color filter. Each border between color filters CF of different colors opposes the light-shielding layer BM.

The overcoat layer OC covers the color filters CF. The overcoat layer OC is formed of a transparent resin material.

The common electrode CE is formed on a side of the overcoat layer OC, which opposes the first substrate SB1. The common electrode CE is formed of a transparent conductive material such as ITO or IZO. The common electrode CE is covered by the second alignment film AL2.

In the first substrate SUB1 and second substrate SUB2 described above, the first alignment film AL1 and the second alignment film AL2 are disposed to oppose each other. Here, a predetermined cell gap is formed between the first substrate SB1 and the second substrate SB2 by a spacer (not shown). The first substrate SUB1 and the second substrate SUB2 are adhered by a sealing material with the cell gap formed therebetween. The liquid crystal layer LQ is held between the first substrate SUB1 and the second substrate SUB2. On the main surface 20B of the second insulating substrate 30, an optical device OD including a polarizer PL is disposed.

FIG. 3 is a plan view showing a structure of the display panel PNL of the embodiment. The sealing material SL is disposed in the region indicated by upward-sloping hatch lines. Here, the left-hand side region to the display area DA is defined as one end side, and the right-hand side region to the display area DA is defined as the other end side.

The sealing material SL includes a first portion SL1 extending along the first direction X, a second portion SL2 extending along the second direction Y, a third portion SL3 extending along the first direction X and a fourth portion SL4 extending along the second direction Y. The first portion SL1 is located on a mounting portion MT side. The first portion SL1 includes an end (first end) portion SLE1 and an end (second end) portion SLE2, extending along the first direction X. The end portion SLE2 is located on a display area DA side with respect to the end portion SLE1. The second portion SL2 crosses the first portion SL1 on one end side of the non-display area NDA. The fourth portion SL4 crosses the first portion SL1 on the other end side of the non-display area NDA. The third portion SL3 crosses the second portion SL2 on the one end side and also crosses the fourth portion SL4 on the other end side. The first portion SL1 and the third portion SL3 oppose each other along the second direction Y via the display area DA. The second portion SL2 and the fourth portion SL4 oppose each other along the first direction X via the display area DA.

The first portion SL1 has a width W1 along the second direction Y. The second portion SL2 has a width W2 along the first direction X. The third portion SL3 has a width W3 along the second direction Y. The fourth portion SL4 has a width W4 along the first direction X. The widths W2, W3 and W4 are, for example, substantially the same as each other. Further, the width W1 is greater than the width W2. Here, in this embodiment, the width W1 is, for example, about 2.5 mm, and the width W2, W3 and W4 are each, for example, about 0.5 mm.

Moreover, in terms of adhesion, of the width W11 of the first portion SL1, a width W1 located between the first substrate SUB1 and the second substrate SUB2 should preferably be substantially the same as at least the widths W2 to W4 of the second to fourth portions SL2 to SL4. Here, in order to improve the adhesion, the width W1a may be greater than the widths W2 to W4, but should preferably be less than at least the width W1.

The first substrate SUB1 includes an end (fourth end) portion SUB1E extending along the first direction X. The second substrate SUB2 includes an end (third end) portion SUB2E extending along the first direction X. The mounting portion MT is located between the end portion SLE1 and the end portion SUB1E. The end portion SUB2E is located between the end portion SLE1 and the end portion SLE2 in plan view. Further, the end portion SLE1 is located between the end portion SUB1E and the end portion SUB2E.

Further, the first substrate SUB1 comprises a plurality of pad electrodes PD for externally connecting to electrical circuits. The pad electrodes PD are arranged along with the first direction X in the mounting portion MT. The bend area BA is located between the end portion SLE2 and the end portion SUB2E. A plurality of signal wiring lines 6 are connected to the pad electrodes PD, respectively, and are arranged along the first direction X to extend along the second direction Y in the bend area BA.

FIG. 4 is a cross-sectional view of the display panel PNL taken along line A-B shown in FIG. 3. Here, the display panel PNL in the non-display area NDA is shown. FIG. 4 shows only the main structure. In the example illustrated, the display panel PNL comprises the first substrate SUB1, the second substrate SUB2, the first portion SL1 and the liquid crystal layer LQ.

As described above, the end portion SLE1 is located between the end portion SUB1E and the end portion SUB2E along the second direction Y. That is, the first portion SL1 includes an overlapping portion SL1a overlapping the second substrate SUB2 and an exposed portion SL1b exposed from the second substrate SUB2. The boundary between the overlapping portion SL1a and the exposed portion SL1b is located on the same plane as that of the end portion SUB2E. That is, the end portion SUB2E overlaps the first partial SL1 in the third direction Z.

Figure 6:
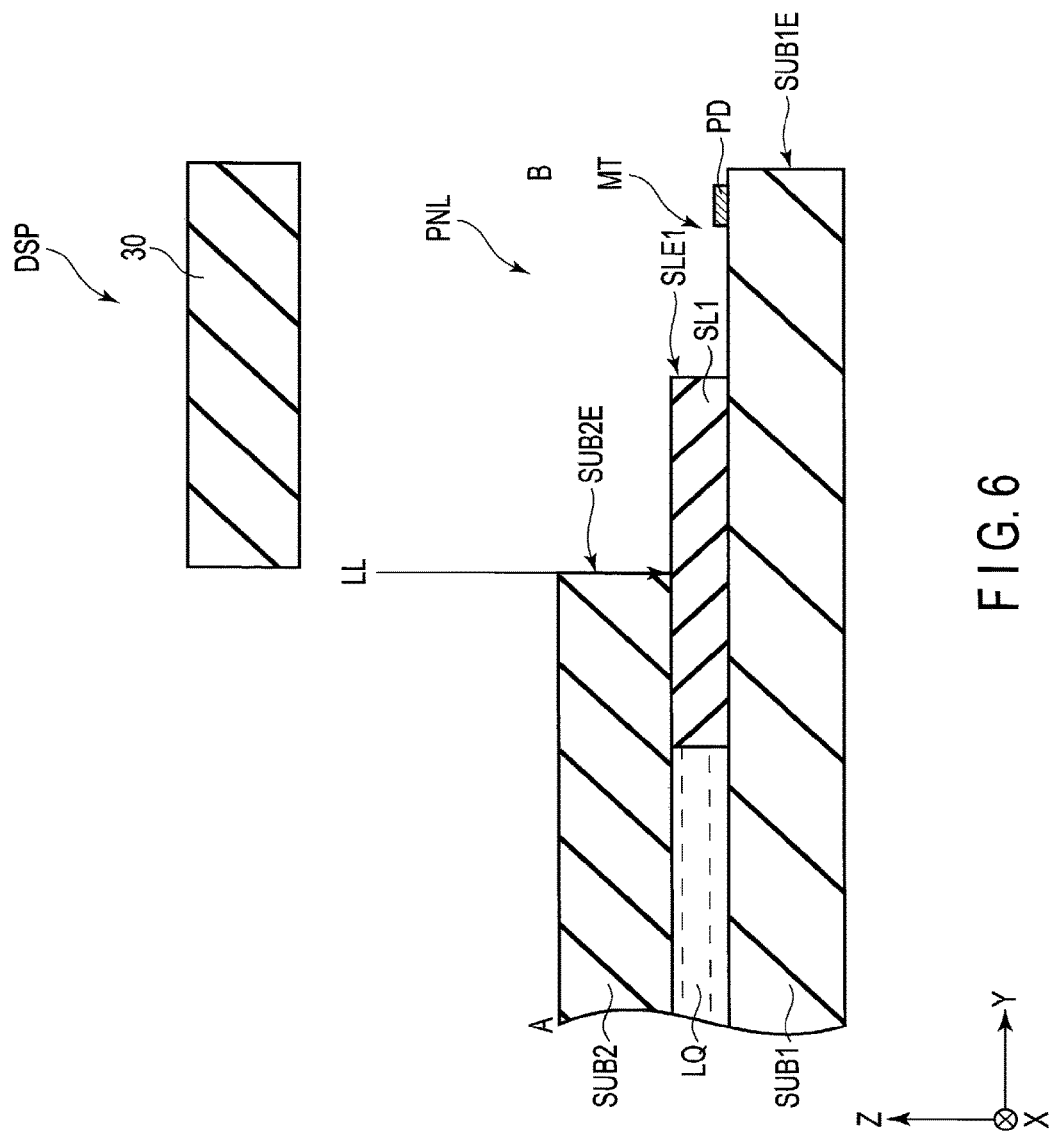
FIG. 6 is a diagram illustrating a following step in the method of manufacturing the display device of the embodiment.

FIGS. 5 and 6 are diagrams each showing a step in the method of manufacturing the display device DSP of this embodiment. FIGS. 5 and 6 each show a step in the manufacturing method in the cross section of the display panel PNL taken along A-B shown in FIG. 3. Here, only the main portions necessary for explanation are illustrated. FIG. 5 shows a processing step after adhering the first mother board used to form a plurality of first substrates SUB1 and a second mother board used to form a plurality of second substrates SUB2 together with a sealing material SL, and then cutting the display panel PNL into individual pieces.

As shown in FIG. 5, the display panel PNL is prepared. In the display panel PNL illustrated, the first substrate SUB1 and the second substrate SUB2 have substantially the same area in the X-Y plane. Here, the end portions SUB1E and SUB2E are located on the same plane along the third direction Z. Further, the end portion SLE1 is located on a liquid crystal layer LQ side with respect to the end portions SUB1E and SUB2E along the second direction Y.

Next, as shown in FIG. 6, the second substrate SUB2 is cut and removed to expose the pad electrodes PD arranged in the first substrate SUB1 to above the display panel PNL. More specifically, with the irradiation of laser beam LL, the second substrate SUB2 is cut to remove a portion 30 of the second substrate SUB2. Here, the second substrate SUB2 is cut in a position overlapping the first partial SL1 along the third direction Z. That is, when the second substrate SUB2 is cut, the laser beam LL reaches the first portion SL1. Here, the first portion SL1 is formed from, for example, a resin material having an acrylate skeleton and in this embodiment, it is formed from epoxy acrylate. The laser beam LL is, for example, a carbon dioxide laser. In this embodiment, the laser beam LL has a wavelength of 308 nm or less. The first portion SL1 requires higher energy to be decomposed by laser light whose wavelength is shorter than 350 nm, than that of the second substrate SUB2. That is, the first portion SL1 is hard to decompose with the light whose wavelength is shorter than 350 nm. Therefore, the second substrate SUB2 is ground and cut by the laser beam LL, but the first portion SL1 is hardly ground.

As described above, by removing the portion 30, the end portion SUB2E overlaps the first portion SL1 along the third direction Z, and the end portion SLE1 is located between the end portion SUB2E and the end portion SUB1E along the second direction Y. Further, the mounting portion MT is formed in the first substrate SUB1, and the pad electrodes PD are exposed to above the display panel PNL.

FIG. 7 is a diagram showing a state where the bend area BA is bent in the display device DSP according to this embodiment.

The bend area BA is bent so that the wiring substrate 1 and the display area DA oppose each other. In the example illustrated, the first insulating substrate 10, a signal wiring lines 6, a first portion SL1 and a second insulating substrate 20 are each bent in the bend area BA. That is, the display device DSP is bent in a position overlapping the first portion SL1.

A support member 5 is disposed between the mounting portion MT and the display area DA. A first adhesive AD1 is disposed between the display panel PNL on a display area DA side and the support member 5 to adhere them together. Further, a second adhesive AD2 is disposed between the display panel PNL on a mounting portion MT side and the support member 5, to adhere them together. The first adhesive AD1 and the second adhesive AD2 are, for example, double-sided tapes.

Note that the support member 5 may not necessarily be provided. Further, for example, a backlight unit may be provided at a position where the support member 5 in disposed in the figure.

Here, in the bend area BA, tensile stress and compressive stress are created in the display panel PNL. The tensile stress becomes maximum in the main surface 20B, whereas the compressive stress becomes maximum in the main surface 10B. When such tensile stress or compressive stress is applied to the signal wiring line 6, the signal wiring line 6 may be undesirably broken. Therefore, in this embodiment, the signal wiring line 6 located in the bend area BA is located in a neutral surface or its vicinity, where both of the compressive stress and tensile stress become zero, and thus it is possible to suppress the break of the signal wiring line 6.

According to this embodiment, the width W1 of the first portion SL1 is greater than the width W2 of the second portion SL2, the width W3 of the third portion SL3 and the width W4 of the fourth portion SL4, and the bend area BA is located to overlap the first portion SL1. That is, in the bend area BA, the sealing material SL is disposed so that the signal wiring line 6 is located in the neutral surface or its vicinity. Thus, the signal wiring line 6 can be protected from the compressive stress and tensile stress. In this manner, the damage such as the breakage of the signal wiring line 6 can be suppressed. Further, the bend area BA is located to overlap the second substrate SUB2. That is, in the bend area BA, the display panel PNL has a laminate structure substantially symmetrical along up and down direction with respect to the neutral surface as the center. With this structure, it become easier to control the neutral surface, and thus it is possible to place the signal wiring line 6 in the neutral surface or its vicinity. Thus, the signal wiring line 6 can be further, protected from the compressive stress and tensile stress, and the damage including the breakage can be reduced.

Further, with the use of the sealing material SL to control the neutral surface, the number of members used to control the neutral surface can be reduced, and therefore the number of processing steps in the manufacture can be reduced. As a result, the manufacturing cost can be reduced.

Note that the signal wiring line 6 is located in the neutral surface or its vicinity, the thickness T1 of the first insulating substrate 10 may be different from the thickness T2 of the second insulating substrate 20 as described above.

Further, according to this embodiment, the end portion SUB2E of the second substrate SUB2 overlaps the first portion SL1 along the third direction Z. That is, as shown in FIG. 6, the second substrate SUB2 is cut by the laser beam LL, and at this time, the laser beam LL reaches the first portion SL1. The energy required for the first portion SL1 to be decompose by laser light of a wavelength shorter than 350 nm is greater than that for the second substrate SUB2 to be decomposed by laser. Therefore, when the second substrate SUB2 is cut in the position overlapping the first portion SL1 with the laser beam LL adjusted to appropriate power, the damage to the first substrate SUB1 can be suppressed, and the decrease in yield can be suppressed.

Moreover, as described above, the portion 30 is removed after the first substrate SUB1 and the second substrate SUB2 are attached together. Therefore, it is not necessary to consider the accuracy of the position of the second substrate SUB2 as compared to the case where the second substrate SUB2 formed smaller by the part of the portion 30 in advance is attached to the first substrate SUB1. Further, up to the processing step of removing the portion 30, the second substrate SUB2 opposes the pad electrode PD along the third direction Z, and therefore the pad electrode PD can be protected.

Further, since the width W1 is greater than the width W2, W3 and W4, the coating area of the first portion SL1 is greater than the coating area of the second portion SL2, the third portion SL3 or the fourth portion SL4. Therefore, the adhesion of the sealing material SL can be improved as compared to the case where the width W1 is similar to the widths W2, W3 and W4. Thus, the peeling of the sealing material SL is suppressed and the reliability can be improved.

Figure 9:
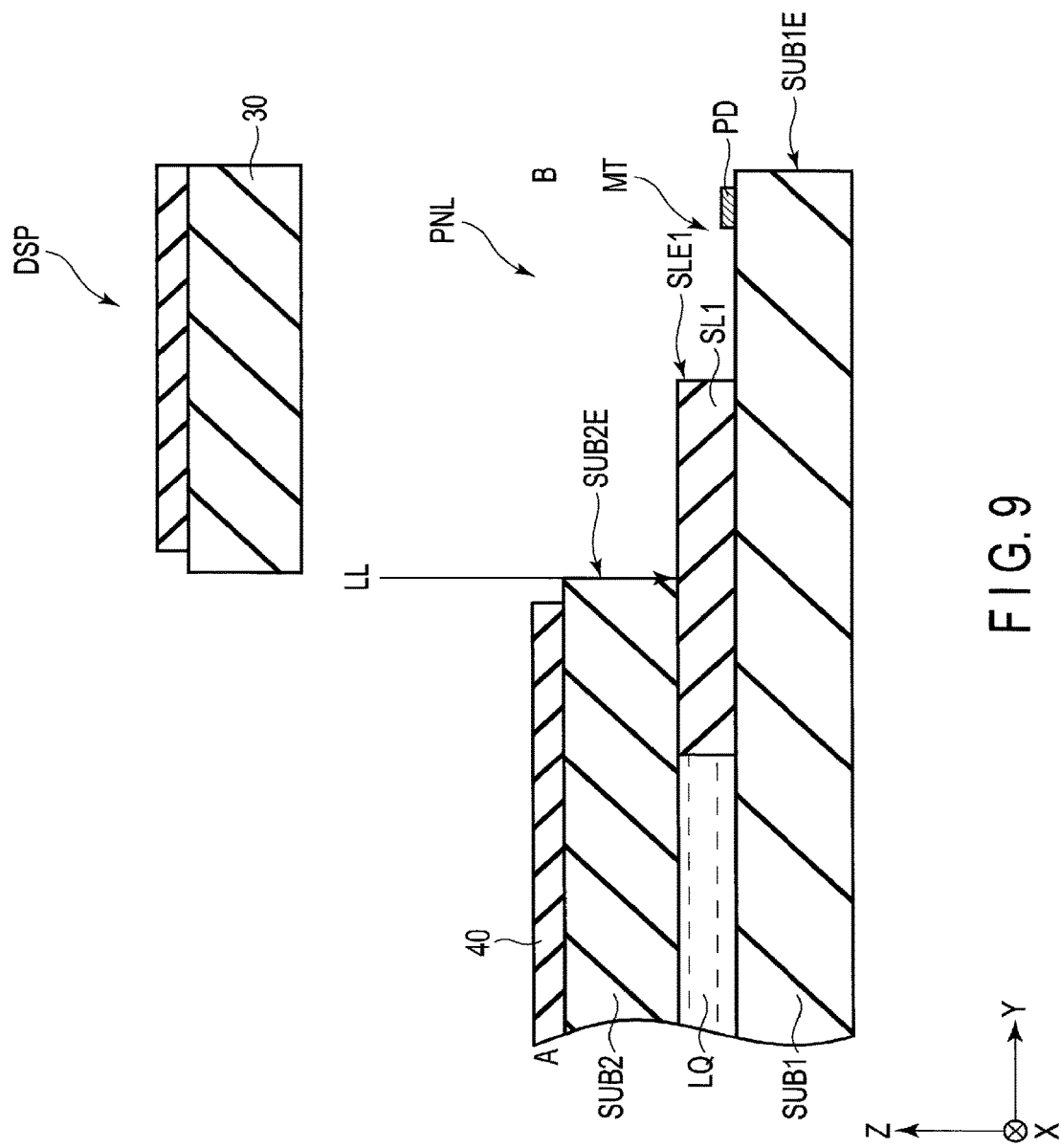
FIG. 9 is a cross-sectional view showing a following step in this method of manufacturing the display device of the embodiment.

FIGS. 8 and 9 are diagrams each showing a processing step in another method of manufacturing the display device DSP of this embodiment. FIGS. 8 and 9 show the manufacturing method in the cross section of the display panel PNL taken along line A-B shown in FIG. 3.

As shown in FIG. 8, a display panel PNL is prepared. The structure shown in FIG. 8 is different from that of FIG. 5 in that the display panel PNL comprises a protective film 40. The protective film 40 is disposed on the display panel PNL to protect the second substrate SUB2 in the manufacturing process. Further, the protective film 40 comprises a gap S. The gap S is formed using a laser similar to that used in the processing step of cutting the display panel PNL into individual pieces, for example, by a CO2 laser.

Next, as shown in FIG. 9, the second substrate SUB2 is cut and removed to expose the pad electrode PD disposed on the first substrate SUB1 to above the display panel PNL. At this time, the laser beam LL is irradiated to the position overlapping the gap S shown in FIG. 8, and thus the second substrate SUB2 is cut and the portion 30 of the second substrate SUB2 is removed. That is, a cut line for cutting the portion 30 is formed by the gap S. With this structure, it suffices if the laser beam LL is irradiated on according to the cut line. Therefore, the accuracy of the position of the laser irradiation can be improved. After removing the portion 30, the protective film 40 is peeled off.

According to the embodiment shown in FIGS. 8 and 9, the protective film 40 with the gap S is disposed on the display panel PNL, and thus the irradiation position of the laser beam LL can be set. Therefore, it is possible to suppress error in cutting position by the laser beam LL, and the second substrate SUB2 can be cut in the position overlapping the first portion SL1. Thus, the damage to the first substrate SUB1 can be suppressed and the decrease in yield can be suppressed. Further, the gap S can be formed simultaneously in the processing step of cutting the display panel PNL into individual pieces, and the decrease in yield can be suppressed without increasing the number of processing steps in the manufacture.

Furthermore, the protective film 40 is formed from a material which shields the laser beam LL. That is, since the second substrate SUB2 is masked by the protective film 40, it is possible to suppress the damage to the second substrate SUB2 by the laser beam LL in the vicinity of the gap S.

In such examples, an advantageous effect similar to that of the above embodiment can be achieved.

As described above, according to the embodiment, a display device which can suppress the decrease in production yield can be obtained.

Note that the embodiment described above is directed to the case where the display device is a liquid crystal display, but the embodiment can be applied as well to the case where the display device is an organic electroluminescence display device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
a first substrate comprising a first insulating substrate;
a second substrate comprising a second insulating substrate and opposing the first substrate;
a liquid crystal layer held between the first substrate and the second substrate; and
an adhesive layer which attaches the first substrate and the second substrate together,
the adhesive layer comprising a first portion extending in a first direction,
the first portion comprising a first end portion and a second end portion, each extending in the first direction,
the second substrate comprising a third end portion located between the first end portion and the second end portion and extending in the first direction,
the third end portion of the second substrate overlapping the first portion in a plan view,
a part of the first portion extending outside the third end portion of the second substrate in a plan view, and
the first substrate and the second substrate being bent in a position overlapping the first portion.

2. The display devices of claim 1, wherein
the first substrate and the second substrate are bent in a position between the second end portion and the third end portion.

3. The display device of claim 1, wherein
the first substrate comprises a fourth end portion extending in the first direction, and comprises a mounting portion between the first end portion and the fourth end portion.

4. The display device of claim 1, wherein
the first insulating substrate and the second insulating substrate are each formed from a polyimide.

5. The display device of claim 1, wherein
the first portion requires energy higher than that of the second substrate, to be decomposed by light of a wavelength shorter than 350 nm.

6. The display device of claim 1, wherein
the adhesive layer is formed from an epoxy acrylate.

7. The display device of claim 1, wherein
the adhesive layer comprises a second portion crossing the first portion and extending along a second direction crossing the first direction, and
a first width of the first portion is greater than a second width of the second portion.

8. The display device of claim 1, wherein
the first substrate comprises a signal wiring line extending in a second direction crossing the first direction in a position overlapping the first portion.

9. The display device of claim 3, further comprising:
a display area surrounded by the adhesive layer; and
a wiring substrate provided on the mounting portion, wherein
the first substrate and the second substrate are bent such that the wiring substrate opposes the display area.

10. The display device of claim 1, further comprising:
a support member adhered to the first substrate, wherein
the first substrate and the second substrate are bent to interpose the support member.

11. The display device of claim 1, wherein the first insulating substrate and the second insulating substrate are different from each other in thickness.

* * * * *